A. BARDIN.
MULTIPLE PLATE REINFORCED GLASS AND PROCESS OF PRODUCING SAME.
APPLICATION FILED APR. 25, 1914.
1,223,135.
Patented Apr. 17, 1917.
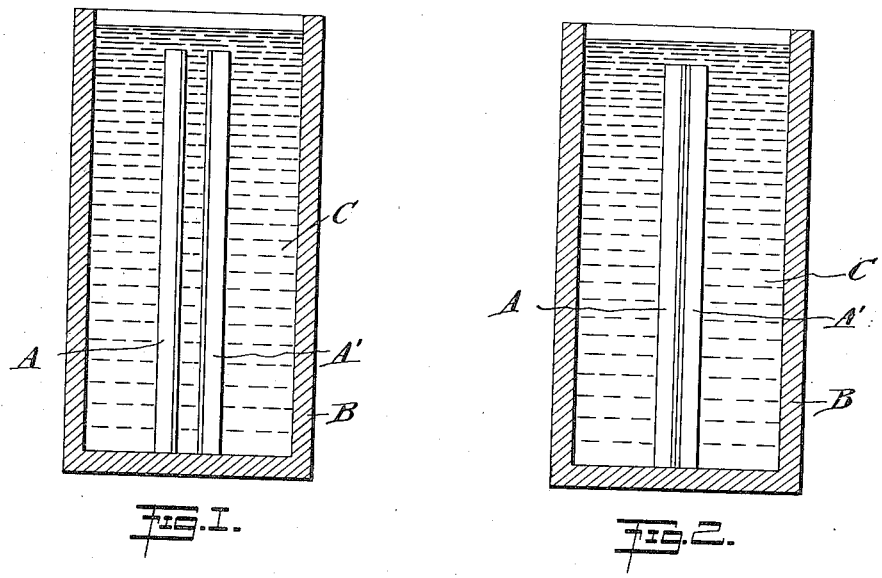
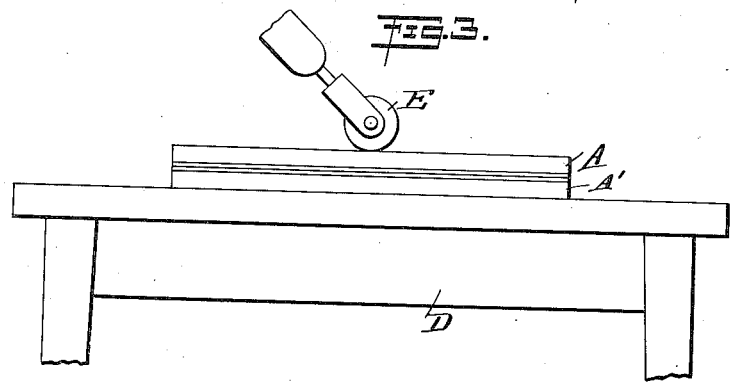
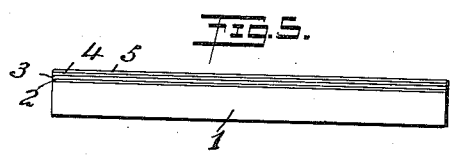
WITNESSES
G. Robert Thomas
O. Bradway.
INVENTOR
Abel Bardin
BY
ATTORNEYS

UNITED STATES PATENT OFFICE.

ABEL BARDIN, OF PARIS, FRANCE.

MULTIPLE-PLATE REINFORCED GLASS AND PROCESS OF PRODUCING SAME.

1,223,135.   Specification of Letters Patent.   Patented Apr. 17, 1917.

Application filed April 25, 1914. Serial No. 834,371.

*To all whom it may concern:*

Be it known that I, ABEL BARDIN, a citizen of the Republic of France, and a resident of Paris, France, have invented a new and Improved Multiple-Plate Reinforced Glass and Processes of Producing Same, of which the following is a full, clear, and exact description.

This invention relates to reinforced glass of the kind disclosed in my pending application for Letters Patent of the United States, Serial Number 779,297, filed July 16, 1913, and the invention has to deal more particularly with a multiple-plate reinforced glass in which the individual plates are united or cemented together to form a unitary article.

The general objects of the invention are to provide a comparatively simple and inexpensive reinforced and armored transparent multiple-plate glass in which the reinforcing substance is thoroughly protected by the coated sides of the plates of glass being placed in contact and united.

In carrying out the invention the reinforced glass plates to be united have their juxtaposed surfaces coated with varnish or equivalent material, and under the coating of varnish of one or both plates is a reinforcing film composed of successive layers or deposits of gelatin, celluloid and gelatin. The varnish on the plates of glass is allowed to harden before the union of the plates is attempted, and in order to unite the plates the surface of the varnish is softened by applying a solvent thereto, such as alcohol, and then the two plates are immediately put together and pressed tightly, so that the varnish on one plate will unite with the varnish of the other plate, whereby the plates become permanently united as a single article when the varnish hardens. Obviously, more than two plates may be combined together in this manner with reinforcing material between each pair of adjacent plates. A simple method of performing the process is to dip the coated plates in a bath of alcohol or equivalent solvent, and while in the bath press the plates together as tightly as possible, and then finally remove the plates from the bath and still further press them together so as to force out from between the plates any excess alcohol, and also to tightly combine the plates.

For a more complete understanding of the invention reference is to be had to the following description and claims taken in connection with the accompanying drawing, in which—

Figure 1 is a sectional view of a tank of alcohol with two plates immersed therein but out of contact;

Fig. 2 is a similar view showing the plates pressed together;

Fig. 3 is a view showing the plates removed from the bath and being finally pressed together to exclude air and alcohol from between the plates;

Fig. 4 is a sectional view of a triple-plate reinforced glass; and

Fig. 5 is a sectional view of a plate of glass showing the various layers that go to make up the reinforcement.

Referring first to Fig. 5, it will be observed that the plate of glass 1 is provided with superimposed layers of gelatin 2, celluloid 3, gelatin 4 and varnish 5, the purposes of which and the manner of application being fully set forth in the application for Letters Patent hereinbefore referred to.

The process of uniting plates of glass reinforced as described consists in dissolving only the surface of the outer coating of the reinforce, namely, the varnish 5, and then pressing two or more plates together so that the varnish of one will unite or coalesce with the varnish of the adjacent plate, whereby a permanent union is effected. The softening or dissolving of the surface is effected by placing the varnish-coated plates A and A' in a tank B containing alcohol or equivalent liquid C. The alcohol acts on the surface of the external coating of the reinforce to soften the varnish slightly, and while the plates are in the bath they are pressed together as shown in Fig. 2. The plates are then removed and subjected to further pressure for more intimately uniting the varnish of one plate with that of the other. Any suitable means may be employed to perform this step. For instance, the plates are placed on a table D, Fig. 3, and a roller or equivalent device E run over the top plate A, for pressing the same against the under plate A'. After this operation the plates are set away to allow the varnish to thoroughly harden. It is to be understood that only one of the plates need be provided with the reinforcing coating of celluloid and gelatin and an external protective coating of varnish, and the other plate need have only varnish so that it will unite with the varnish of the reinforced plates.

The method of uniting a plurality of plates may be adapted for a triple-plate glass as shown in Fig. 4, wherein the several plates are designated by the character 6 and the reinforcing coating by the character 7. It will be noted that the intermediate plate 6 is coated on both sides while the outer plates are coated only on their inner faces. Obviously, a multiple-plate glass embodying more than three plates may be made in the manner just described.

Having thus described my invention, I claim as new and desire to secure by Letters Patent:

1. The herein-described process of making multiple-plate reinforced glass, which consists in applying to a glass plate superimposed layers of gelatin, celluloid, gelatin and varnish; applying to another plate a layer of varnish; immersing the plates after the varnish hardens in a bath of solvent; pressing the varnished sides of the plates together while in the bath; and finally pressing the plates together out of the bath to force out solvent from between the plates.

2. A multiple-plate reinforced glass comprising a plate of glass having superimposed layers of gelatin, celluloid, gelatin and varnish; and a plate of glass having a layer of varnish united with the layer of varnish of the first-mentioned plate.

In testimony whereof I have signed my name to this specification in the presence of two subscribing witnesses.

ABEL BARDIN.

Witnesses:
  CHATTAN BRADWAY,
  PHILIP D. ROLLHAUS.